United States Patent
Hao et al.

(10) Patent No.: US 9,230,262 B2
(45) Date of Patent: Jan. 5, 2016

(54) SMOOTHED VISUALIZATION HAVING RINGS CONTAINING PIXELS REPRESENTING UNEVENLY SPACED DATA

(75) Inventors: Ming C. Hao, Palo Alto, CA (US); Soma Sundaram Santhiveeran, Fremont, CA (US); Sebastian Mittelstädt, Constance (DE); Umeshwar Dayal, Saratoga, CA (US); Daniel Keim, Steisslingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 93 days.

(21) Appl. No.: 13/456,297

(22) Filed: Apr. 26, 2012

(65) Prior Publication Data

US 2013/0286039 A1    Oct. 31, 2013

(51) Int. Cl.
*G06T 11/20* (2006.01)
*G06Q 30/02* (2012.01)
*G09G 5/02* (2006.01)

(52) U.S. Cl.
CPC .............. *G06Q 30/02* (2013.01); *G06T 11/206* (2013.01); *G09G 5/02* (2013.01)

(58) Field of Classification Search
CPC ......... G06T 11/20; G06T 11/00; G06T 15/00; G09G 5/02
USPC ................................... 345/440, 593
See application file for complete search history.

(56) References Cited

U.S. PATENT DOCUMENTS

| | | | |
|---|---|---|---|
| 7,266,781 B1 * | 9/2007 | Burlowski | 715/834 |
| 8,022,952 B2 | 9/2011 | Hao | |
| 8,068,104 B2 | 11/2011 | Rampersad | |
| 8,184,016 B2 | 5/2012 | Gray | |
| 8,638,981 B2 | 1/2014 | Hao | |
| 2004/0205450 A1 * | 10/2004 | Hao et al. | 715/500 |
| 2006/0053005 A1 | 3/2006 | Gulati | |
| 2006/0059439 A1 * | 3/2006 | Hao et al. | 715/805 |
| 2007/0255707 A1 | 11/2007 | Tresser et al. | |
| 2008/0229226 A1 | 9/2008 | Rowbottom | |
| 2009/0033664 A1 | 2/2009 | Hao et al. | |
| 2009/0289809 A1 | 11/2009 | Gray | |
| 2010/0162170 A1 * | 6/2010 | Johns et al. | 715/834 |

(Continued)

OTHER PUBLICATIONS

Citing Draper A Survey of Radial Methods for Information Visualization, 2009, IEEE Computer Society, 'IEEE Transactions on Visualization and Computer Graphics' vol. 15, pp. 759-776.*

(Continued)

*Primary Examiner* — Stephen R Koziol
*Assistant Examiner* — Terrell Robinson
(74) *Attorney, Agent, or Firm* — Trop, Pruner & Hu, P.C.

(57) ABSTRACT

Unevenly spaced data records are received over time. A smoothed graphical visualization has a plurality of discrete rings to allow for detection of periodical patterns in the data records, where the discrete rings correspond to plural time periods and contain pixels representing values of an attribute of the data records. Visual indicators are assigned to the corresponding pixels, where a first of a visual indicators for a first time interval that is missing a data record is based on aggregating values of the attribute of neighboring data records, and where a second of the visual indicators for a second time interval having multiple data records is based on aggregating values of the attribute of the multiple data records.

19 Claims, 7 Drawing Sheets
(3 of 7 Drawing Sheet(s) Filed in Color)

(56) References Cited

U.S. PATENT DOCUMENTS

| | | | |
|---|---|---|---|
| 2010/0231594 A1* | 9/2010 | Hao et al. ............... | 345/440 |
| 2010/0279469 A1 | 11/2010 | Jin | |
| 2011/0072378 A1 | 3/2011 | Nurminen | |
| 2011/0148773 A1 | 6/2011 | Rudolph | |
| 2011/0184575 A1 | 7/2011 | Kawamoto | |
| 2011/0279469 A1* | 11/2011 | Hao et al. ............... | 345/582 |
| 2013/0278623 A1 | 10/2013 | Hao | |

OTHER PUBLICATIONS

Citing Aris 'Representing Unevenly-Spaced Time Series Data for Visualization and Interactive Exploration', 2005, Springer, 'Proc. International Conference on Human-Computer Interaction', pp. 835-846.*

Kosara, Robert, "Visualization: It's More than Pictures", "Statistical Computing & Graphics", Jul. 2011, vol. 22, pp. 5-7, [Retrieved on Jun. 3, 2015], Retrieved from Internet<URL:http://stat-computing.org/newsletter/issues/scgn-22-1.pdf.*

Tominski et al., Enhanced Interactive Spiral Display, Proceedings of the Annual SIGRAD Conference, Special Theme: Interactivity, pp. 53-56. Linköping University Electronic Press (2008).

Bostock, Michael, Protovis: A Graphical System for Visualization, Mar. 2009 (10 pages).

Barnett, V., The Ordering of Multivariate Data, Journal of the Royal Statistical Society. Series A (General), vol. 139, No. 3 (1976), pp. 318-355.

Zaixian Xie, Towards Exploratory Visualization of Multivariate Streaming Data, Oct. 2007 (2 pages).

Asadi et al., Abstract—Expert Systems with Applications: An International Journal, vol. 39, Issue, 5, A new hybrid for improvement of auto-regressive integrated moving average models applying particle swarm optimization, Apr. 2012 (1 page).

Ming C. Hao et al., U.S. Appl. No. 13/363,597 entitled Placing temporally aligned and variably sized pixels in discrete rings in a graphical visualization filed Feb. 1, 2012 (22 pages).

Ming C. Hao et al., U.S. Appl. No. 13/450,598 entitled Providing a Correlation Ring for Indicating Correlation Between Attributes filed Apr. 19, 2012 (23 pages).

U.S. Appl. No. 13/450,598, Non-Final Rejection dated Dec. 17, 2014, pp. 1-27 and attachments.

Huang, Guilan, "Geovisuolizing Data with Ring Maps", 2008, ArcUser, pp. 54-55, [Retrieved on Nov. 6, 2015], Retrieved from the Internet <URL:http://www.esri.com/news/arcuser/0408/files/ringmaps.pdf>.

OA Final cited in U.S. Appl. No. 13/450,598 dated Jun. 29, 2015; 37 pages.

* cited by examiner

SMOOTHED VISUALIZATION HAVING RINGS CONTAINING PIXELS REPRESENTING UNEVENLY SPACED DATA

BACKGROUND

An enterprise can collect a relatively large amount of data records over time. Such data records can be visualized in graphical visualizations. However, visualizing relatively large amounts of data records can be associated with various challenges.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

An enterprise (e.g. business concern, educational organization, government agency, individual, etc.) can collect a relatively large amount of data records. For example, an enterprise can receive measurements regarding individuals at one or multiple locations, such as retail stores, shopping malls, airports, or other venues. The measurements that can be made can include measurements regarding an amount of time (dwelling time) a particular individual stays at a particular location, such as to view an advertisement, to browse through products that are being offered for sale, and so forth. The measurements can be taken with various measuring devices, including cameras, and/or other types of sensing devices.

In addition to being able to measure an amount of time each particular individual stays at a particular location, the measurement devices can in some cases also measure other characteristics of individuals, such as age, gender, and so forth. As an example, images of individuals can be processed, and image recognition subsystems can be used for determining the age, gender, and/or other characteristics of individuals. The amount of dwelling time measured for an individual being at a particular location can be based on determining a time interval at which the individual is located at the particular location.

Acquiring various information as set forth above can allow an enterprise to better understand effectiveness of advertisements, popularity of offerings, and so forth. Such understanding can allow an enterprise to better tailor its advertising campaign, and to emphasize marketing efforts on offerings that are more popular than others.

Although reference is made to measurements regarding characteristics of individuals, it is noted that in some other examples, other types of measurements can be received, such as measurements from various monitoring devices in a system, such as a network of devices, a data center, a system of storage devices, and so forth. The collected measurements can include performance measurements, such as utilization of computer servers, utilization of storage devices, data rates through communication devices, data traffic delays at various points in a data center, and so forth. The collected measurements can be provided in the form of data records.

In other examples, data records can include other types of data, such as financial data (e.g. revenue, profit, etc.) of the enterprise, user feedback (expressing user sentiments regarding a product or service offering, for example) collected by the enterprise, data relating to physical infrastructure (e.g. power utilization, water utilization, etc.), and so forth.

As yet further examples, data records can include measurements made in monitoring vehicle traffic. For example, measurements can be made regarding amounts of time that vehicles take to pass through respective segments of roads.

The collected data records can be in the form of a time series, where data records are collected over time in a sequence of time intervals. A data record can generally refer to a representation of data that can have one or multiple attributes. One example of an attribute can be a time attribute, which can indicate a time associated with the data record (e.g. time that the data was acquired or received). Another attribute can represent a value that is being measured, such as any of the foregoing measures discussed above.

In some cases, data records received over time can be unevenly spaced. Unevenly spaced data records can refer to data records that do not arrive evenly in a sequence of time intervals. In a sequence of unevenly spaced data records, at least a first of the time intervals has a number of data records that is different from at least another of the time intervals. For example, one time interval can have multiple data records, while another time interval can have no data records. The time interval without any data record refers to a time interval in which a gap in data records occurs.

Figure 1:
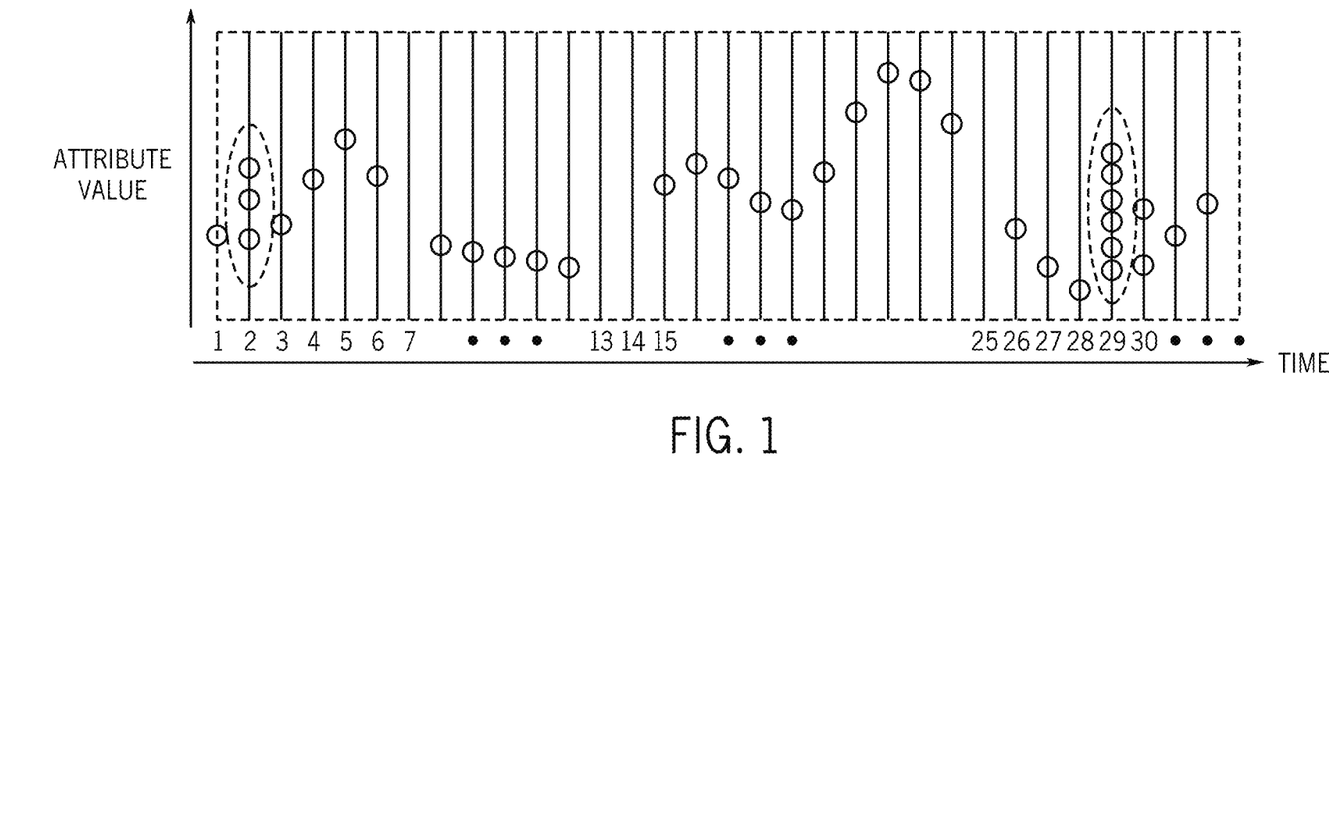
FIG. 1 is a timing diagram of attribute values for unevenly spaced data records received over time.

FIG. 1 is a timing diagram illustrating unevenly spaced data records received over time (represented by the horizontal axis). The vertical axis represents a value of an attribute of the respective data records. In the example of FIG. 1, in time interval 1, one data record is received. In time interval 2, three data records are received. In each of time intervals 7, 13, 14, and 25, no data record is received. In time interval 29, six data records are received.

It can be difficult to understand periodical patterns associated with a collection of unevenly spaced data records. A "periodical pattern" can refer to a pattern that may repeat over time, such as in respective time periods (e.g. days, weeks, months, etc.).

Figure 2:
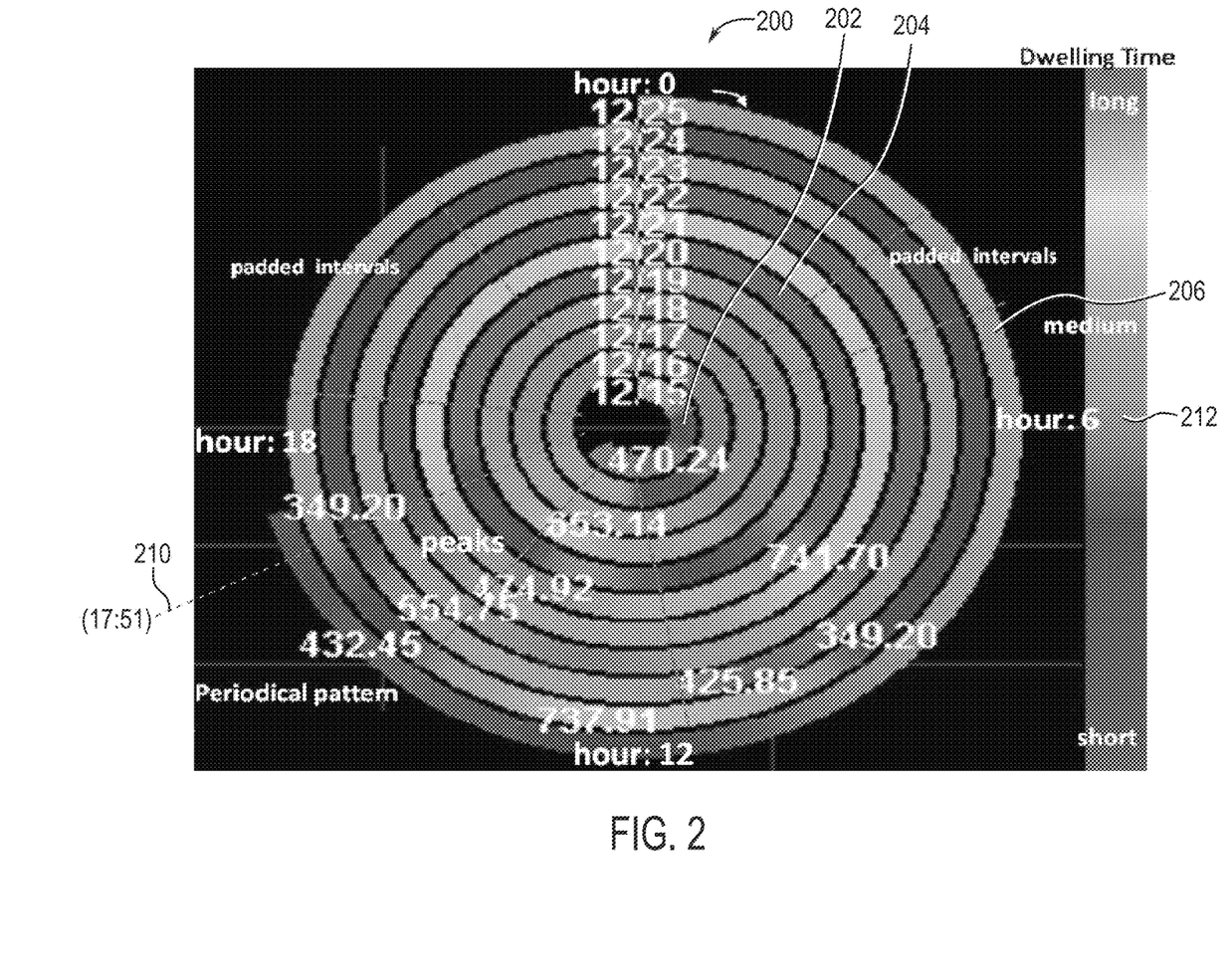
FIG. 2 illustrates an example ring-based graphical visualization that includes discrete rings of pixels, according to some implementations.

In accordance with some implementations, a smoothed ring-based graphical visualization is provided to allow for visual depiction of unevenly spaced data records that allow for detection, by an analyst, of periodical patterns that may be present in the unevenly spaced data records. The ring-based graphical visualization is "smoothed" in the sense that uneven spacing of the data records is removed or reduced in the graphical visualization. FIG. 2 is an example of a ring-based graphical visualization 200, which has multiple discrete annular rings (202, 204, and 206 are labeled). Each discrete annular ring contains pixels that represent corresponding data records in a respective time interval. A pixel corresponds to a particular time interval (e.g. a time interval can be a measurement interval during which a measurement can be taken to provide a value of an attribute). Within each discrete annular ring, the pixels are temporally arranged according to the time attribute of the data records.

This time interval represented by each pixel has a different time length than that of the time period represented by a discrete annular ring. A time period corresponding to a discrete ring is made up of multiple time intervals. As a specific example, a time period corresponding to a discrete annular ring can be a day, whereas a time interval corresponding to a pixel can be a minute.

Assuming that each discrete annular ring represents a day, then there can be 1,440 pixels (24×60) in each discrete annular ring, to represent the 1,440 minutes within each day. In a different example, each pixel can represent a data record for an hour—in such example, a discrete annular ring would include 24 pixels, to represent the 24 hours within each day.

A collection of data records can be divided into multiple time periods, where each time period can correspond to a respective one of the discrete annular rings of the ring-based graphical visualization 200.

For example, the innermost discrete annular ring 202 can contain pixels representing data records for a first day, an intermediate discrete annular ring 204 can contain pixels representing data records for a day after the first day, and an outermost discrete annular ring 206 can contain pixels representing data records for another later day. Although three discrete annular rings 202, 204, and 206 are labeled in FIG. 2, note that there are other intermediate discrete annular rings in the example graphical visualization 200 that correspond to other days. Moreover, as additional data records are received and added to the graphical visualization 200, additional discrete annular rings can be added to the graphical visualization 200.

Although FIG. 2 shows discrete annular rings for corresponding different days, it is noted that in other examples, the discrete annular rings can correspond to different time periods, such as hours, weeks, months, years, and so forth.

Note that a discrete annular ring can be generally circular in shape. Alternatively, a discrete annular ring can have a different shape, such as a rectangular shape, a polygon shape, and so forth.

Additionally, the pixels across different discrete annular rings are temporally aligned such that along a given radial axis in the ring-based graphical visualization 200, the pixels in the different discrete annular rings represent the same time interval. For example, temporally aligning the pixels along a radial axis across different discrete annular rings can refer to the fact that the pixels in the different annular rings along the radial axis represent data records in different days at the same minute. For example, a radial axis 210 depicted in FIG. 2 can correspond to the 51$^{st}$ minute of hour 17 (17:51). The pixels in the discrete annular rings that are along the radial axis 210 represent data records for hour 17, minute 51 (17:51) on multiple consecutive days.

By aligning pixels across the discrete rings, pattern comparison can be made across different time periods. Moreover, within each particular discrete ring, the pixels are of equal size. Note that pixels in different discrete rings can have different sizes, with a pixel in an outer discrete ring having a larger size than a pixel in an inner discrete ring. More generally, the size of a pixel within a given discrete ring is computed based on a diameter of the discrete ring.

The pixels are assigned corresponding visual indicators, which can be colors as shown in FIG. 2. A color scale 212 is depicted in FIG. 2 and maps different colors to different values of the attribute that is being depicted. In the example graphical visualization 200 of FIG. 2, the attribute that is being visualized is dwelling time, which represents an amount of time an individual spends at a particular location. Different dwelling times are assigned different colors in the color scale 212. The pixels depicted in the different discrete annular rings are assigned different colors according to different values of the dwelling time attribute at respective time intervals. For example, a relatively long dwelling time can be assigned a red color, while a relatively short dwelling time can be assigned a blue color.

In other examples, visual indicators assigned to pixels can be for another attribute. Moreover, instead of using different colors, other types of visual indicators can be assigned to pixels, such as different graphical patterns, different gray levels, and so forth.

FIG. 2 also shows that the discrete annular rings are separated from each other by visible boundaries, in the form of dark circles between the discrete annular rings. This allows a user to easily recognize groups of pixels for corresponding different time periods represented by the respective discrete rings.

In accordance with some implementations, a visual indicator assigned to a pixel in a time interval having multiple data records or having no data records is computed differently from a visual indicator assigned to a pixel for a time interval in which there is just a single data record. For a time interval where there is just a single data record, the visual indicator assigned is based on the value of the attribute of the single data record. For a time interval in which there are multiple data records, the visual indicator assigned to the corresponding pixel is based on an aggregate (e.g. average, median, sum, maximum, minimum, etc.) of the multiple data records.

For a given time interval that is without any data record, the visual indicator assigned to the corresponding pixel is based on an aggregate (e.g. average, weighted average, mean, median, sum, etc.) of neighboring data records. A "neighboring" data record refers to a data record that is in an interval that is either adjacent or within some predefined number of time intervals of the given time interval in which there is no data record. By assigning a visual indicator to a pixel based on attribute values of neighboring data records, "padding" is considered to have been provided for a time interval that is missing a data record. Such padding can be considered a moving aggregate padding, since the neighboring data records used for padding different time intervals with missing data records are different.

By being able to assign visual indicators to pixels for time intervals (containing multiple or no data records) that give rise to uneven spacing of data records, a smoothed, ring-based graphical visualization (where visual indicators are provided to remove or reduce unevenness in received data records) can be provided, such that periodical patterns in the data record can more easily be detected in the graphical visualization. Effectively, the unevenly spaced data records are smoothed in the ring-based graphical visualization without overlapping pixels for multiple data records and without having gaps that correspond to missing data records. Also, anomaly detection in the data records (such as detecting peaks, including highest and lowest attribute values) can be performed based on the ring-based graphical visualization.

In some implementations, an analyst can select a particular pixel to obtain additional information regarding the pixel. For example, when the analyst moves a cursor over a particular pixel, a pop-up box can be created to depict additional information regarding the selected pixel. Alternatively, the pixels can be displayed elsewhere in the graphical visualization, such as a region in the graphical visualization or a relatively small window selected from a menu, as examples. More generally, the pixels in the ring-based graphical visualization 200 are user accessible in an interactive manner to allow user viewing of additional information of the corresponding data record. In addition to being able to select a particular pixel, an analyst can also interactively select a group of pixels to drill down for detailed information.

Figure 3:
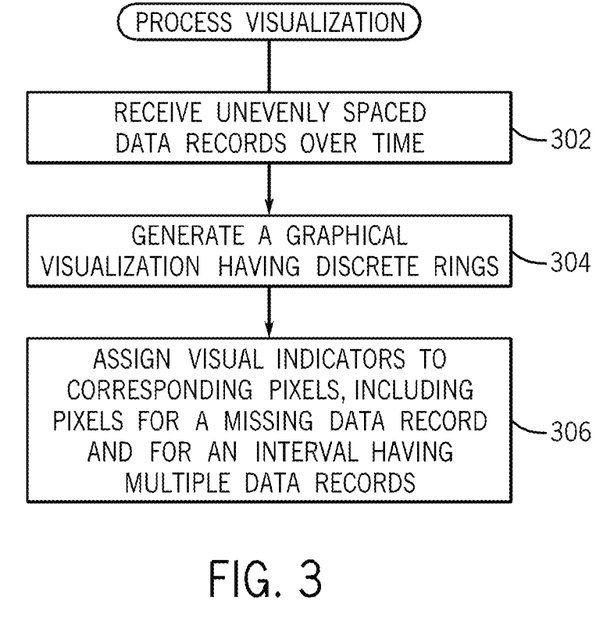
FIG. 3 is a flow diagram of a process of providing a ring-based graphical visualization according to some implementations.

FIG. 3 is a flow diagram of a visualization process according to some implementations. The process receives (at 302) unevenly spaced data records over time. The received data records can be part of a historical data set, or alternatively, the data records can be received in real-time. In the real-time scenario, such data records can be visualized in a ring-based graphical visualization as the data records are received. This is an example of real-time visualization.

The process further generates (at 304) a graphical visualization having discrete rings, where the discrete rings correspond to plural time periods and contain pixels representing values of an attribute of the data records.

The process assigns (at 306) visual indicators to the corresponding pixels, where a first of the visual indicators for a first time interval that is missing a data record is based on aggregating values of the attribute of neighboring data records, and where a second of the visual indicators for a second time interval having multiple data records is based on aggregating values of the attribute of the multiple data records.

In the real-time scenario, pixels can be added to an outer discrete ring as new data records are received. Note that as new data records arrive, visual indicators are assigned to pixels representing the new data records in the manner discussed above. Moreover, previously assigned visual indicators of certain pixels may be modified if such pixels were assigned visual indicators based on neighboring data records (for the case of a time interval missing a data record), since a newly received pixel may be one of the neighbors.

Figure 4A:
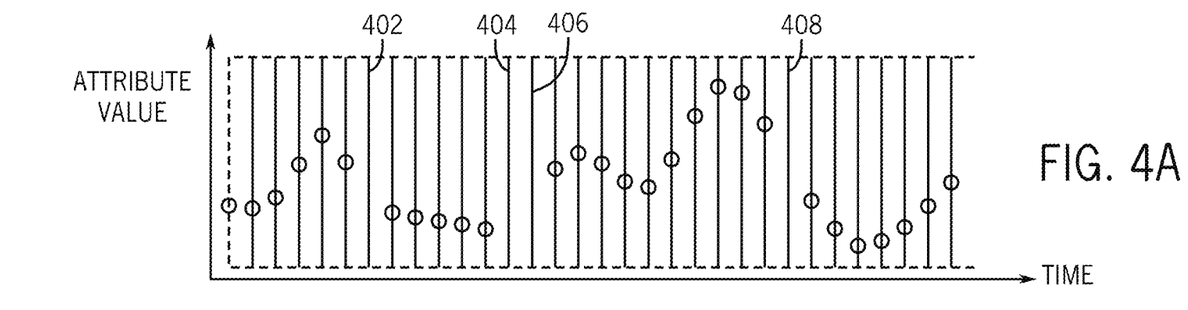
FIG. 4A-4C are graphs illustrating an example of estimating attribute values of missing data records, according to some implementations.
Figure 4B:
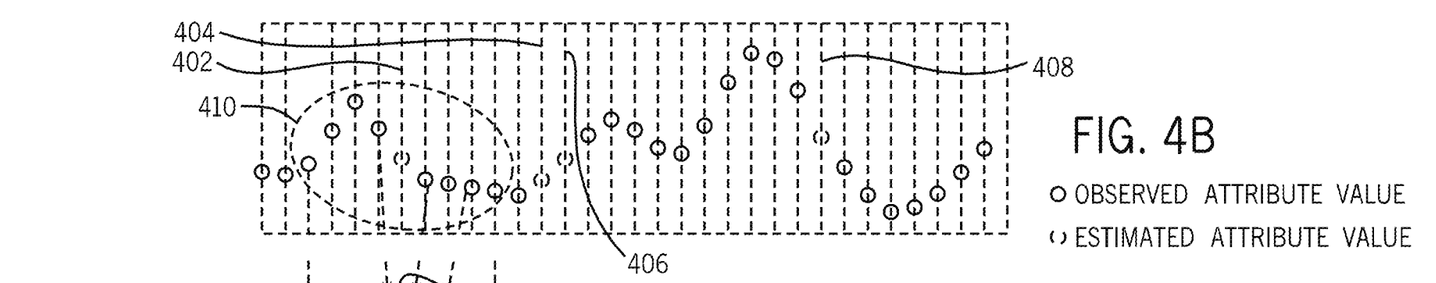

FIG. 4A is an example timing diagram illustrating unevenly spaced data records received over time (the horizontal axis). The vertical axis represents a value of an attribute that is being measured. As depicted in FIG. 4A, various time intervals 402, 404, 406, and 408 are associated with gaps (these time intervals are missing data records). For a given time interval (e.g. 402) that is missing a data record, an estimated attribute value can be generated for this time interval by performing an aggregate of neighboring data records. In some examples, the aggregate can be performed on values of the attribute data records in four time intervals immediately prior to time interval 402, and in four time intervals immediately after the time interval 402, as indicated by the oval 410 in FIG. 4B. In FIGS. 4A and 4B, a solid circle represents an actually measured attribute value, while a dashed circle represents an estimated attribute value (estimated based on neighboring data records).

Figure 4C:
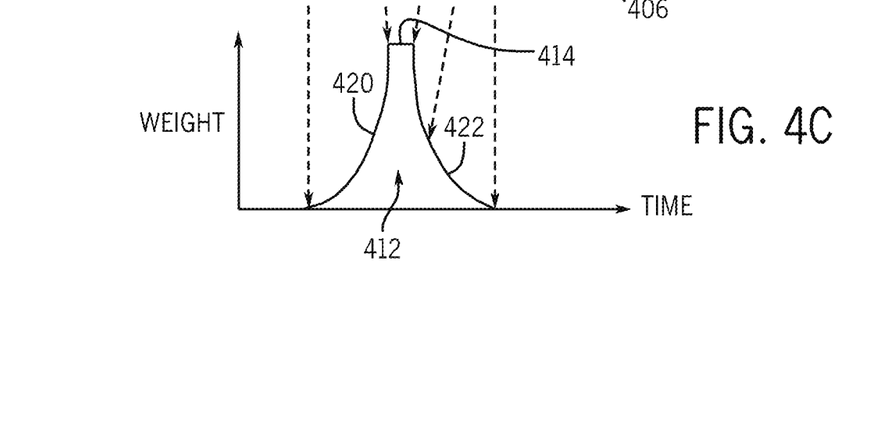

In some examples, the aggregate to estimate an attribute value for a missing data record can be a weighted aggregate, such as a weighted average. FIG. 4C depicts a curve 412 that represents weights that can be assigned to the respective neighboring data records. The horizontal axis of the graph of FIG. 4C is a time axis, while the vertical axis of the graph of FIG. 4C is a weight axis (to indicate a value of a weight to be used for a corresponding neighboring attribute value). The highest weight (as represented by level 414 of the curve 412), is assigned to the neighboring data records in time intervals that are immediately adjacent the time interval 402 that is missing a data record. The weights are progressively reduced with time distance from the time interval 402, as depicted by curved portions 420 and 422 of the curve 412.

The curve 412 represents exponential weighting of attribute values of neighboring data records (of time interval 402), in accordance with some examples. Mathematically, the value of the attribute estimated for a time interval that is missing a data record can be expressed as follows:

$$v(T) = \sum_{t=T-n}^{T+n} w(t) * v(t),$$

where v(T) represents the estimated value for the time interval T that is missing a data record, w(t) represents a weight to be applied to value v(t) of a neighboring data record, and n represents the number of neighboring data records (on each side of time interval T) to use for estimating the attribute value for the time interval that is missing a data record. In some examples, w(t) is represented by the curve 412 of FIG. 4C.

Figure 5:
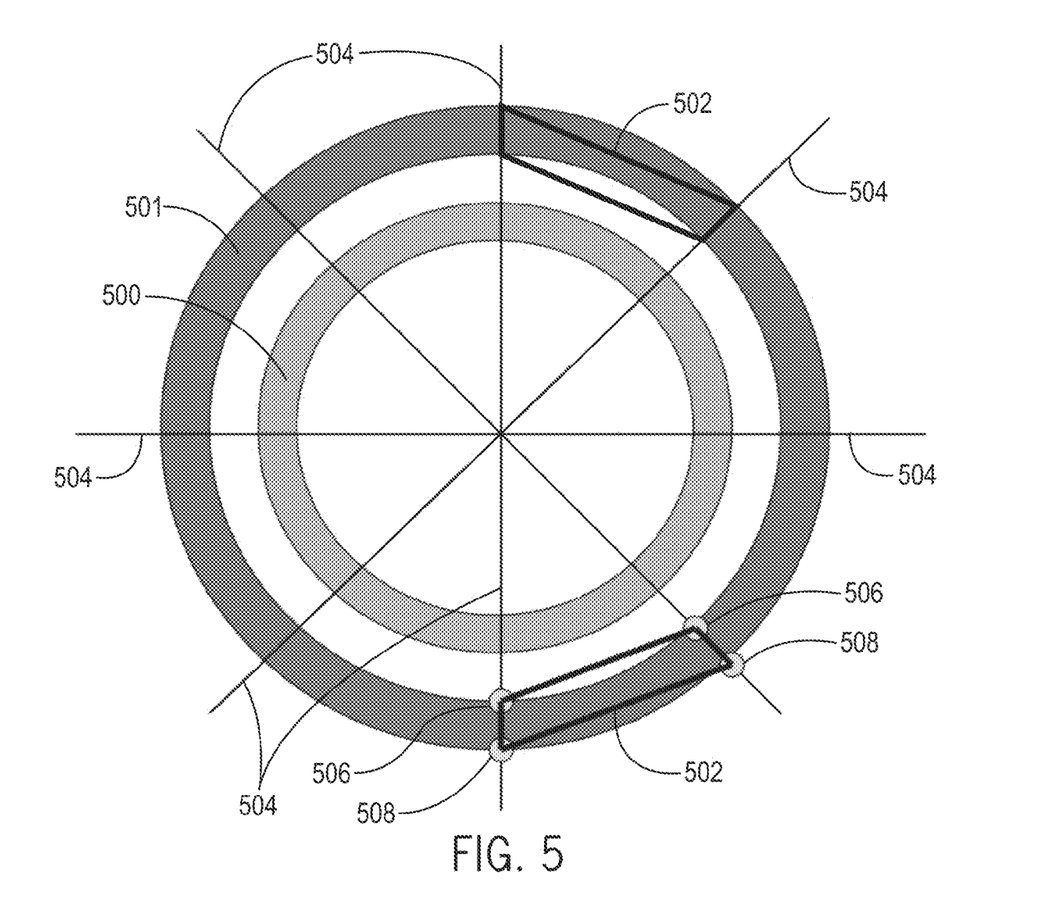
FIG. 5 illustrates parameters associated with discrete rings of a graphical visualization according to some implementations.

FIG. 5 shows example discrete rings 500 and 501 along with the various parameters associated with each discrete ring. The discrete rings 500 and 501 can correspond to any of the discrete rings depicted in FIG. 2.

A number of sectors is calculated for each discrete ring. Note that both discrete rings 500 and 501 include the same number of sectors. Each sector is represented generally by a polygon 502 in FIG. 5. Each polygon 502 defines generally the area in which a corresponding pixel in the discrete ring 501 is located. The number of sectors 502 depends upon the number of pixels to be included in the discrete ring.

A pair of adjacent sector lines 504 define a sector 502; each sector 502 is defined between two adjacent sector lines 504. Two radial points 506 and 508 along each sector line 504 can be determined for each corresponding discrete ring. The two radial points 506 and 508 define the width of the discrete ring, which in the example in FIG. 5 is the discrete ring 501. The points 506, 508 on the sector lines 504 are connected together (at 410) to form a polygon 502.

In FIG. 5, each annular ring 500 or 501 includes eight pixels (which correspond to the eight sectors defined by the sector lines 504 of FIG. 5). In total, the two annular rings 500 and 501 include 16 pixels.

Figure 6:
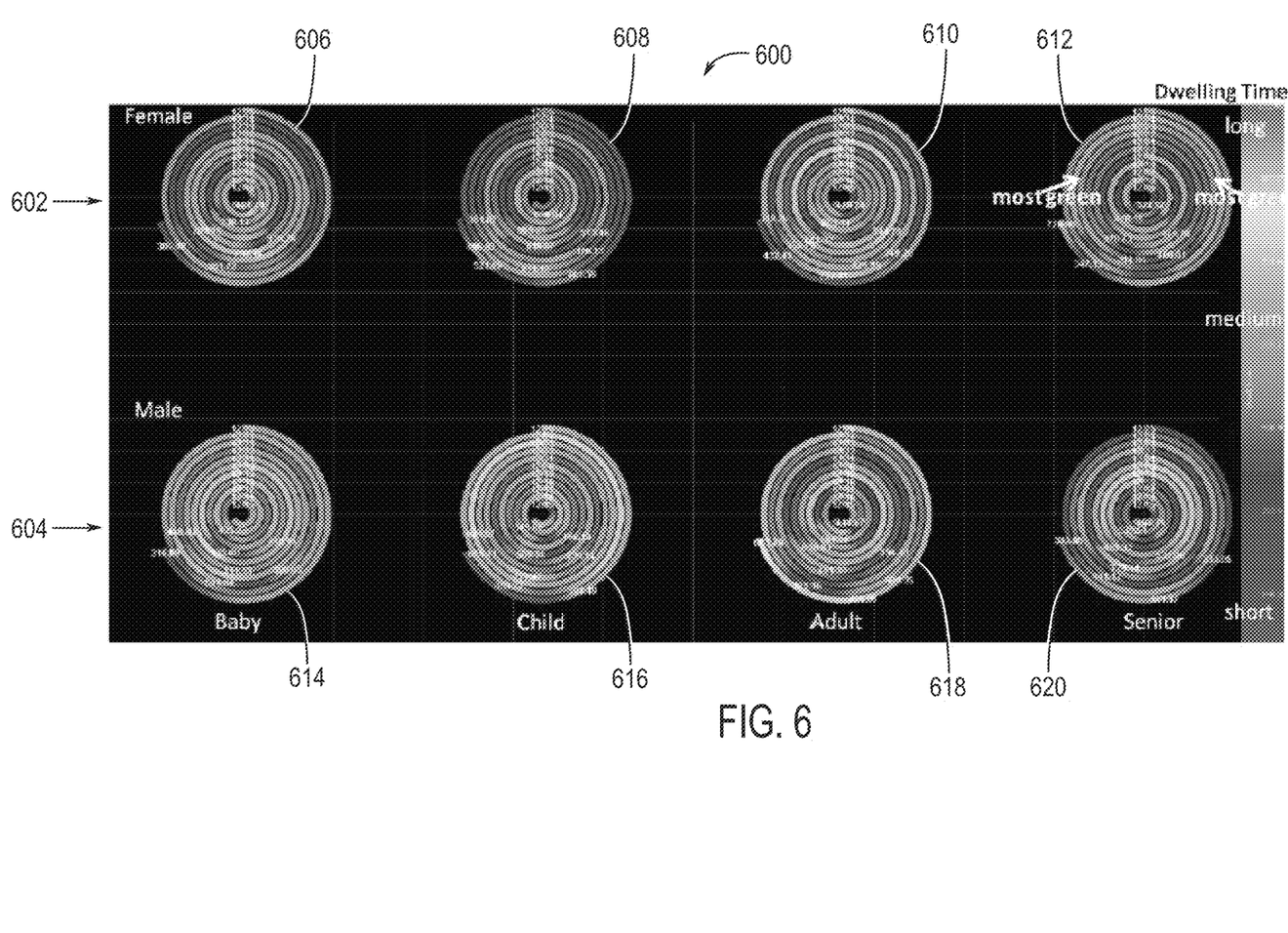
FIG. 6 is a ring-based graphical visualization of multiple categories of data records, according to alternative implementations.

FIG. 6 depicts a graphical visualization 600 that has multiple sets of discrete rings that correspond to different categories of data records. A first row 602 in the graphical visualization 600 includes four sets 606, 608, 610, and 612 of discrete rings, while a second row 604 includes another four sets 614, 616, 618, and 620 of discrete rings. The first row 602 contains graphical elements (sets of discrete rings) for female individuals, while the second row 604 contains graphical elements (sets of discrete rings) for male individuals.

The columns of the graphical visualization 600 correspond to further categories, including a baby category in the first column, a child category in the second column, an adult category in the third column, and a senior category in the fourth column.

The multiple sets of discrete rings 606, 608, 610, 612, 614, 616, 618, and 620 allow for visualization of attribute values for different categories of the data records. In this way, an analyst can compare behaviors by gender and by age. In some examples, certain patterns can be discovered for female adults, where such patterns may not appear in male adults. The graphical visualization provides visualization across multiple dimensions, including time, different categories (such as age and gender), and attribute values.

Figure 7:
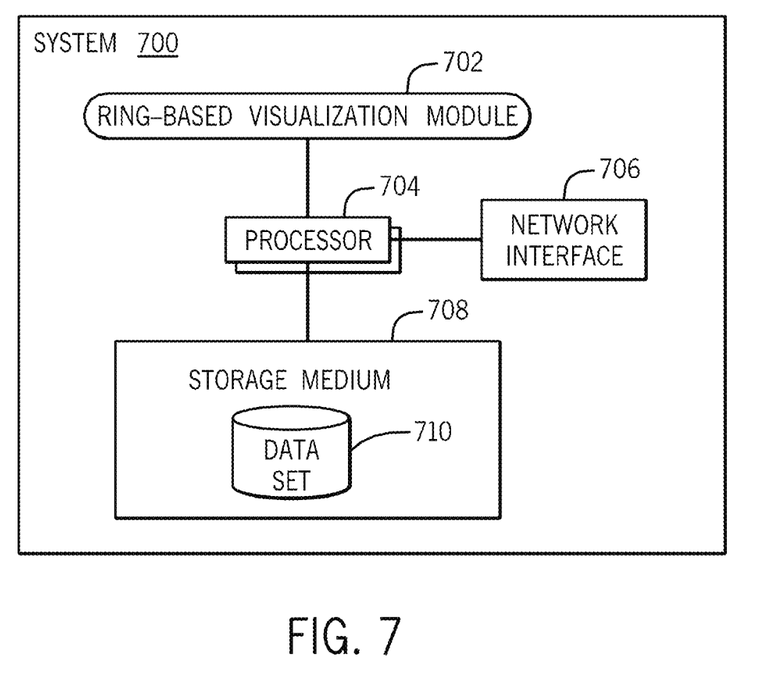
FIG. 7 is a block diagram of an example system incorporating some implementations.

FIG. 7 is a block diagram of an example system 700 that includes a ring-based visualization module 702 that can be implemented as machine-readable instructions executable on one or more processors 704. A processor can include a microprocessor, microcontroller, processor module or subsystem, programmable integrated circuit, programmable gate array, or another control or computing device.

The ring-based visualization module 702 is able to perform processes discussed above, including the process of FIG. 3, for example. The processor(s) 704 can be connected to a network interface 706 to communicate over a network and can be connected to a storage medium (or storage media) 708. The storage medium (or storage media) 708 can store a data set 710, such as a set of data records. Data set 710 can be a historical data set that was previously acquired, or alternatively, the data set 710 can include data records that are continually received by the system 700, where such continually-received data points are visualized in real-time using the ring-based visualization module 702.

The storage medium or storage media 708 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
    generating, by a system including a processor, a smoothed graphical visualization having discrete rings to allow for detection of periodical patterns in unevenly spaced data records over time, where the discrete rings at different locations along a radial axis represent respective plural different time periods, and the discrete rings contain pixels representing values of an attribute of the data records, wherein a first of the discrete rings encircles a second of the discrete rings, and wherein each time period of the plural time periods comprises a plurality of time intervals, each pixel of the pixels represents a respective data record for a corresponding time interval, and pixels of a subset of the pixels along the radial axis are time aligned so that the pixels of the subset represent a common time interval of the plurality of time intervals; and
    assigning, by the system, visual indicators to the corresponding pixels,
    where a first of the visual indicators for a first time interval that is without a data record is based on aggregating values of the attribute of neighboring data records including first and second neighboring data records, wherein the first neighboring data record is earlier in time than the first time interval, and the second neighboring data record is later in time than the first time interval, and
    where a second of the visual indicators for a second time interval having multiple data records is based on aggregating values of the attribute of the multiple data records.

2. The method of claim 1, wherein the discrete rings are part of a first set that represents a first category of the data records, the method further comprising:
    generating a second set of discrete rings for a second category of the data records, wherein the discrete rings in the second set contain pixels representing values of the attribute of the data records in the second category; and
    arranging the first set of discrete rings in a first row of the graphical visualization, and arranging the second set of discrete rings in a second row of the graphical visualization.

3. The method of claim 2, wherein the first and second categories are categories of a first dimension, the method further comprising:
    generating another set of discrete rings for another category in another dimension.

4. The method of claim 1, further comprising:
    within a particular one of the discrete rings, placing the respective pixels in sequence according to time intervals.

5. The method of claim 1, wherein assigning the first visual indicator is based on computing a weighted aggregate of the values of the attribute of the neighboring data records.

6. The method of claim 5, wherein the weighted aggregate is a moving weighted average.

7. The method of claim 5, wherein the weighted aggregate is based on weights that vary with time distance of the neighboring data records to the first time interval.

8. The method of claim 1, wherein assigning the visual indicators comprise assigning colors to the pixels.

9. The method of claim 1, wherein the discrete rings further include a third discrete ring that encircles the first discrete ring.

10. An article comprising at least one non-transitory machine-readable storage medium storing instructions that upon execution cause a system to:
    receive unevenly spaced data records over time, where a first time interval is without a data record, and a second time interval has multiple data records;
    place pixels representing the received data records into discrete rings of a smoothed graphical visualization to allow for detection of periodical patterns in the data records, where the discrete rings at different locations along a radial axis represent respective plural different time periods, and wherein a first of the discrete rings encircles a second of the discrete rings, wherein each time period of the plural time periods comprises a plurality of time intervals, each pixel of the pixels representing a respective data record for a corresponding time interval, and pixels of a subset of the pixels along the radial axis are time aligned so that the pixels of the subset represent a common time interval of the plurality of time intervals;

assign visual indicators to the pixels according to values of an attribute of the received data records, wherein a pixel associated with the first time interval is assigned a visual indicator based on aggregating values of the attribute of neighboring data records, wherein the neighboring data records include a first neighboring data record that is earlier in time than the first time interval, and a second neighboring data record that is later in time than the first time interval, and wherein aggregating the values of the attribute of the neighboring data records aggregates the values of the attribute of the first and second neighboring data records, and wherein a pixel associated with the second time interval is assigned a visual indicator based on aggregating values of the attribute of the multiple data records.

11. The article of claim 10, wherein a third time interval has a single data record, and wherein a pixel in the graphical visualization associated with the third time interval is assigned a visual indicator based on a value of the attribute of the single data record.

12. The article of claim 10, wherein aggregating values of the attribute of the multiple data records includes computing an aggregate selected from among an average, sum, median, maximum, or minimum of values of the attribute of the multiple data records.

13. The article of claim 10, wherein aggregating values of the attribute of the neighboring data records includes computing a moving weighted aggregate of the values of the attribute of the neighboring data records.

14. The article of claim 13, wherein the moving weighted aggregate is based on weights that vary with time distance of the neighboring data records to the first time interval.

15. The article of claim 10, wherein the graphical visualization provides multiple sets of the discrete rings, where the multiple sets are divided according to categories along at least a first dimension.

16. The article of claim 15, wherein the multiple sets are divided according to categories of a plurality of dimensions.

17. The article of claim 10, wherein the discrete rings include more than two concentric discrete rings.

18. A system comprising:
at least one processor; and
a non-transitory machine-readable storage medium storing instructions that are executable on the at least one processor to:
receive unevenly spaced data records over time;
generate a smoothed graphical visualization having a plurality of discrete rings to allow for detection of periodical patterns in the data records, where the discrete rings at different locations along a radial axis represent respective plural different time periods and contain pixels representing values of an attribute of the data records, and wherein a first of the discrete rings encircles a second of the discrete rings, wherein each time period of the plural time periods comprises a plurality of time intervals, each pixel of the pixels represents a respective data record for a corresponding time interval, and pixels of a subset of the pixels along the radial axis are time aligned so that the pixels of the subset represent a common time interval of the plurality of time intervals; and
assign visual indicators to the corresponding pixels,
where a first of the visual indicators for a first time interval that is without a data record is based on aggregating values of the attribute of neighboring data records, wherein the neighboring data records include a first neighboring data record that is earlier in time than the first time interval that is missing a data record, and a second neighboring data record that is later in time than the first time interval that is missing a data record, and wherein aggregating the values of the attribute of the neighboring data records aggregates the values of the attribute of the first and second neighboring data records, and
where a second of the visual indicators for a second time interval having multiple data records is based on aggregating values of the attribute of the multiple data records.

19. The system of claim 18, wherein the visual indicators include different colors according to different values of the attribute.

* * * * *